(No Model.)
C. A. BENTZEN.
MECHANICAL MOVEMENT.
No. 254,907. Patented Mar. 14, 1882.
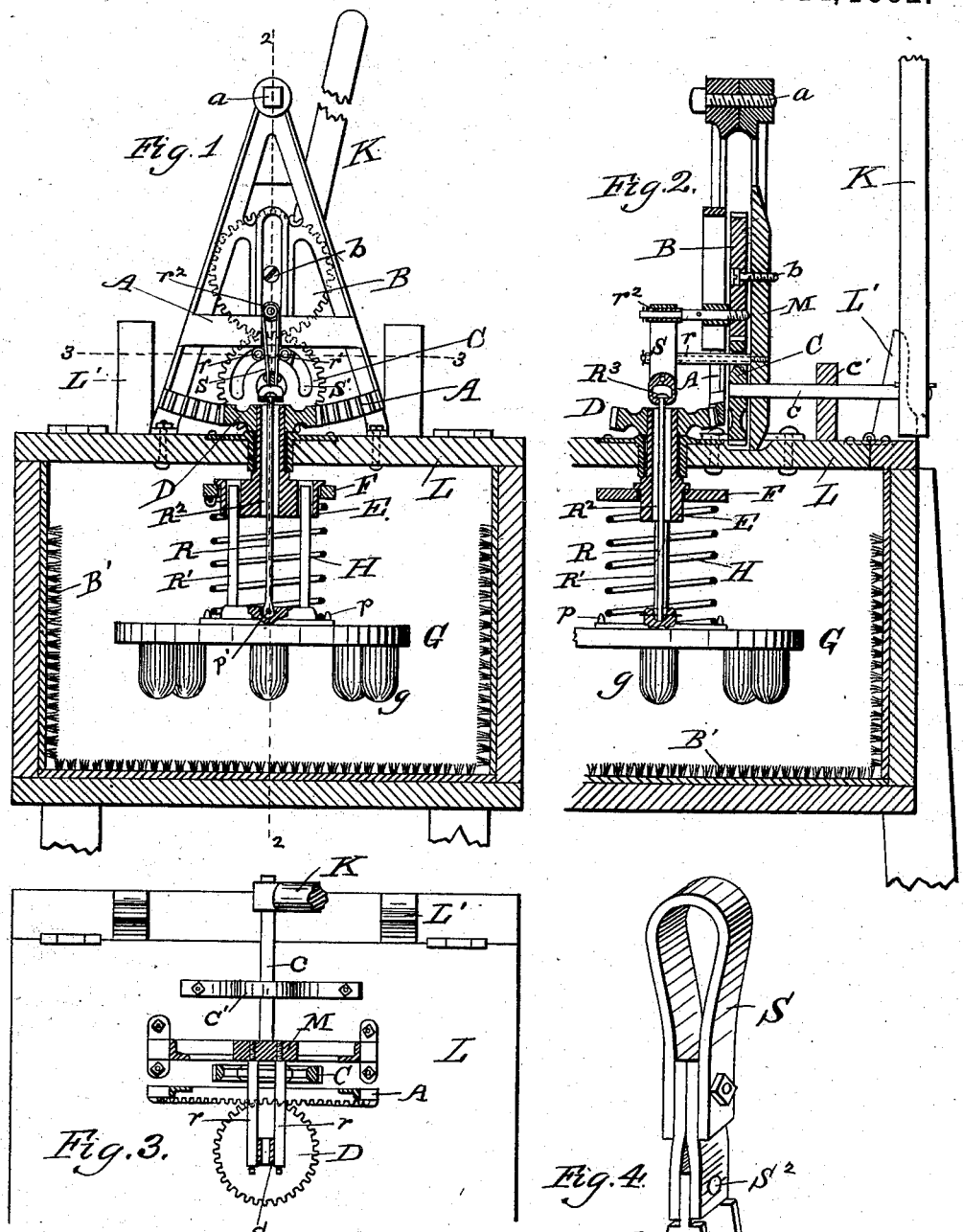
WITNESSES
F. B. Townsend
Chas. E. Gaylord
INVENTOR
Charles A. Bentzen

UNITED STATES PATENT OFFICE.

CHARLES A. BENTZEN, OF CHICAGO, ILLINOIS.

MECHANICAL MOVEMENT.

SPECIFICATION forming part of Letters Patent No. 254,907, dated March 14, 1882.

Application filed January 27, 1882. (No model.)

*To all whom it may concern:*

Be it known that I, CHARLES A. BENTZEN, of the city of Chicago, county of Cook, and State of Illinois, have invented certain Improvements in Mechanical Movements, of which the following is a specification.

The object of my invention is to provide a mechanical device by means of which a reciprocating vertical and either a horizontal rotary or a reciprocating semi-rotary motion may be imparted to the rubbing and agitating device for a washing-machine, or to any other machine requiring the same movements.

My device is especially designed to operate a washing-machine like the one for which Letters Patent of the United States were issued to me, bearing date the 22d day of March, 1881, No. 239,081. I have accomplished that object by means of the parts and combination of parts hereinafter described with reference to the accompanying drawings, in which—

Figure 1 represents a cross vertical section of a part of said device, and of the box of a washing-machine, and of a part of the device therein contained; Fig. 2, a like section of the same, taken as indicated by the broken lines 2 2 in Fig. 1; Fig. 3, a horizontal section of the device, taken as indicated by the broken lines 3 3 in Fig. 1; and Fig. 4, a detail view of loop S.

B' indicates the rice-root brushes with which the containing-box is lined; G, a disk bearing the rubbers $g$. $p$ are pins on the upper side of disk G, and serve to confine the spiral spring H below; and F, a board or collar inclosing hollow cylinder E to confine the springs above; R, a connecting-rod, by which vertical motion is imparted to disk G from the device. R' are guide-rods, which are fastened to the disk G at their lower end, and the upper ends of which work vertically through openings in the flange of the hollow cylinder E.

When the connecting-rod R is reciprocated vertically the disk G, with its rubbers, has the same motion, and when the hollow cylinder E is revolved in its bearings in the top L of the box the like rotary motion is also imparted to the disk G. The frame M, supporting the mechanical device, stands upright upon the box and carries two gear-wheels, B and C, on their respective shafts $b$ and $c$, the latter shaft being further sustained by standard C' and operated by lever-handle K. The segment-gear A is pivoted to and swings upon bolt $a$ in the top of the frame, and its teeth gear with those of bevel-wheel D, which is fastened upon hollow journal E. The motion is given by the lower gear, C, to the upper gear, B, and that gear has upon its outer face, under the shaft $b$ and near its periphery, a wrist, $r^2$, extending out perpendicularly, and that wrist works in a vertical slot in the body of the segment-gear, and by means of that slot and wrist the segment-gear is vibrated through the connection of the lower gear, C, and its shaft, and the bevel-wheel D and the hollow journal E are vibrated back and forth.

The lower gear-wheel, C, is provided with a semicircular slot, S', extending around through it near its periphery, and through this slot extend two pins, $r$, from the frame of the machine, and these pins stand one upon each side of the vertical center line of the segment-gear when at rest, so that the gear-wheel will turn a little more than a half-circle back and forth without obstruction from the pins, which may be provided with friction-rollers, as shown in Fig. 2. The wrist $r^2$ may also be provided with such a roller, as shown.

Now, in order to impart the vertical motion to the disk G through the connecting-rod R, a loop, S, made of leather or any supple and suitable material, is placed upon and over wrist $r^2$ and extended down between the pins $r$, and is suitably attached below to the upper end of connecting-rod R. Then, when the segment-gear is vibrated to the right and left, the wrist $r^2$ rises and falls, and in doing so draws up and down the disk G. The two pins $r$ merely confine the portion of the loop below them to a true vertical motion. The upper portion of the loop is the only portion subjected to much wear, and can be easily replaced when worn out or broken, it being connected to the rest of the device by bolt and nut, as shown in Fig. 4.

The function of the spring H is to force down again the disk G when it shall have been drawn up by the described mechanical movement.

It is obvious that by removing the lever K and substituting a crank, and also removing the two pins $r$, the gear B might be revolved instead of being vibrated, and the motions given to the disk would be the same.

What I claim as my invention, and desire to secure by Letters Patent, is—

1. The gear-wheel B, mounted upon shaft $b$, and having wrist $r^2$, adapted to impart vibratory motion to segment-gear A, substantially as described.

2. The combination of gear-wheel B, having wrist $r^2$, loop S, and connecting-rod R, adapted to transmit vertical motion to disk G, substantially as described.

3. The combination of slotted gear C with the pins $r$, adapted to secure true vertical motion to the lower part of loop S, substantially as described.

4. The gear-wheel C, mounted on shaft $c$, having teeth on its periphery and the circular slot S' through it, adapted to impart motion from its shaft to gear-wheel B and move over pins $r$ by reason of its semicircular slot S', substantially as described.

5. The spring H, in combination with disk G, having the two guide-rods R' and the hollow journal E, adapted to force down again the disk after it has been drawn up by the described mechanical movement, substantially as described.

CHARLES A. BENTZEN.

Witnesses:
E. C. DENIG,
JAS. B. FINLEY.